US009988214B2

(12) United States Patent
Ragan

(10) Patent No.: US 9,988,214 B2
(45) Date of Patent: Jun. 5, 2018

(54) RADIUS CONVEYOR WITH MAGNETIC BEARING

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days. days.

(21) Appl. No.: 15/512,730

(22) PCT Filed: Sep. 24, 2015

(86) PCT No.: PCT/US2015/051974
§ 371 (c)(1),
(2) Date: Mar. 20, 2017

(87) PCT Pub. No.: WO2016/060818
PCT Pub. Date: Apr. 21, 2016

(65) Prior Publication Data
US 2017/0247192 A1      Aug. 31, 2017

Related U.S. Application Data

(60) Provisional application No. 62/063,734, filed on Oct. 14, 2014.

(51) Int. Cl.
| | |
|---|---|
| *B65G 17/38* | (2006.01) |
| *B65G 15/58* | (2006.01) |
| *B65G 21/20* | (2006.01) |
| *B65G 17/08* | (2006.01) |
| *B65G 15/60* | (2006.01) |

(52) U.S. Cl.
CPC ....... *B65G 21/2009* (2013.01); *B65G 17/086* (2013.01); *B65G 15/60* (2013.01)

(58) Field of Classification Search
CPC .... B65G 21/2009; B65G 15/10; B65G 15/02; B65G 15/60; B65G 15/62; B65G 15/64; F16C 32/00; F16C 32/04
USPC ......................................... 198/805, 852, 617
See application file for complete search history.

(56) References Cited

U.S. PATENT DOCUMENTS

| | | | | |
|---|---|---|---|---|
| 4,805,761 | A | * | 2/1989 | Totsch .................. B65G 54/02 104/156 |
| 4,823,939 | A | * | 4/1989 | Langhans .......... B65G 21/2009 198/690.1 |
| 4,981,208 | A | | 1/1991 | Jones |
| | | | | (Continued) |

FOREIGN PATENT DOCUMENTS

JP              60112512 A       6/1985

*Primary Examiner* — James R Bidwell
(74) *Attorney, Agent, or Firm* — James T. Cronvich

(57) ABSTRACT

A radius conveyor comprising a sideflexing conveyor belt and a touchless magnetic bearing at the inside of a turn. The conveyor belt has electrically conductive elements in a side edge. An array of permanent magnets along the conveyor's side rail at the inside of the turn produces a permanent magnetic field. As the conveyor belt is driven through the turn, the permanent magnet field induces currents in the electrically conductive material. The currents produce reaction magnetic fields opposed to the permanent magnetic field that result in a radially outward force pushing the conveyor belt away from frictional contact with the side rail. Alternatively, permanent magnets in the side edge of the belt and electrically conductive elements in the conveyor's side rail likewise provide a magnetic bearing.

11 Claims, 2 Drawing Sheets

(56) References Cited

U.S. PATENT DOCUMENTS

| | | | | |
|---|---|---|---|---|
| 5,036,969 A | * | 8/1991 | Garbagnati | B65G 21/2009 198/690.1 |
| 5,165,527 A | * | 11/1992 | Garbagnati | B65G 21/2009 198/690.1 |
| 5,641,054 A | | 6/1997 | Mori et al. | |
| 6,155,406 A | * | 12/2000 | Garbagnati | B65G 21/2009 198/805 |
| 7,121,400 B2 | * | 10/2006 | Fandella | B65G 17/086 198/619 |
| 7,597,188 B2 | * | 10/2009 | Volpi | B29C 45/0013 198/690.1 |
| 8,839,948 B2 | * | 9/2014 | Landrum | B65G 15/64 198/617 |
| 2006/0081447 A1 | | 4/2006 | Fandella | |
| 2010/0213031 A1 | | 8/2010 | Krech et al. | |
| 2011/0062001 A1 | | 3/2011 | Garbagnati et al. | |
| 2013/0334015 A1 | * | 12/2013 | Lasecki | B65G 17/083 198/851 |

* cited by examiner

RADIUS CONVEYOR WITH MAGNETIC BEARING

BACKGROUND

The invention relates generally to power-driven conveyors and more particularly to radius belt conveyors.

When negotiating a turn, modular radius, or sideflexing, conveyor belts experience high radial forces at the inside radius of the turn. The resulting sliding friction between a rail at the inside of the turn and the side edge of the sideflexing belt increases belt tension and wear of the belt edge. Both increased belt tension and wear reduce belt life.

SUMMARY

A conveyor embodying features of the invention comprises a sideflexing conveyor belt supported in a conveyor frame that includes a carryway with a turn section. The sideflexing conveyor belt is driven along the carryway and through the turn section. A side edge of the belt with first field-producing elements advances along the inside radius of the turn section. Second field-producing elements are disposed along the inside radius of the turn section. The first-field-producing elements form an array of permanent magnets, and the second field-producing elements are electrically conductive elements, or vice versa. The array of permanent magnets produces a magnetic field that induces currents in electrically conductive elements in the side edge of the conveyor belt. The induced currents produce an induced magnetic field that is opposed by the array's magnetic field. The result is a radially outward force directed against the sideflexing conveyor belt advancing through the turn section.

In another aspect of the invention, one version of a conveyor belt embodying features of the invention comprises a series of rows of belt modules hingedly linked together. The series of rows extend in width from a first side edge to a second side edge. Electrically conductive plates are disposed along the first side edge of the rows of belt modules.

Another version of such a modular conveyor belt comprises a series of rows of belt modules hingedly linked together. The series of rows extend in width across an intermediate portion from a first side edge to a second side edge. Electrically conductive elements are disposed along the first side edge. The intermediate portion is devoid of electrically conductive elements.

DETAILED DESCRIPTION

Figure 1:
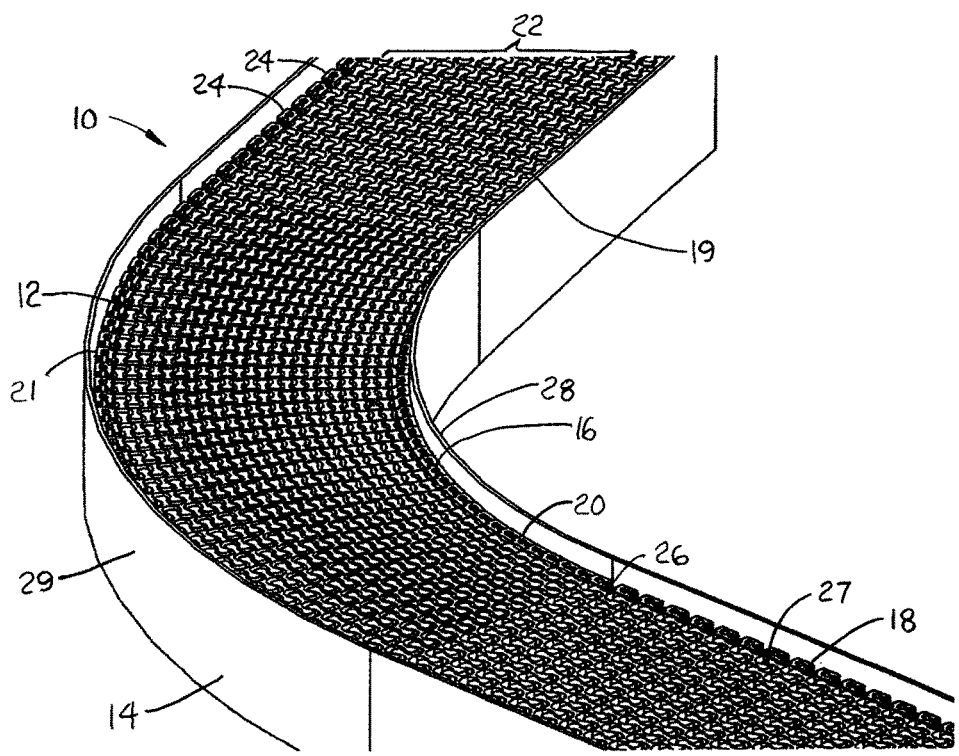
FIG. 1 is an isometric view of a portion of a radius conveyor embodying features of the invention.

A portion of the carryway of a radius conveyor embodying features of the invention is shown in FIG. 1. The conveyor 10 includes a radius, or sideflexing, conveyor belt 12 supported in a conveyor frame 14. The top run of the conveyor belt 12 is supported on a carryway consisting of wearstrips or a carryway pan. The carryway is shown with a turn section 16 between two straight segments 18, 19. The conveyor belt 12 extends in width from a first side edge 20 to a second side edge 21 across an intermediate portion 22 constituting the majority of the width of the belt. The conveyor belt 12 is shown as a modular plastic conveyor belt constructed of a series of rows 24 of one or more belt modules 26 hingedly linked together by hinge rods (25, FIG. 3) at hinge joints 27 between consecutive rows. The sideflexing belt 12 has at least one set of elongated hinge-rod holes (23, FIG. 3) along each belt row 24 to allow the inside edge of the belt to collapse at the inside radius 28 of the turn section 16 while the outside edge 21 is fanned out at the outside radius 29 of the turn.

Figure 2:
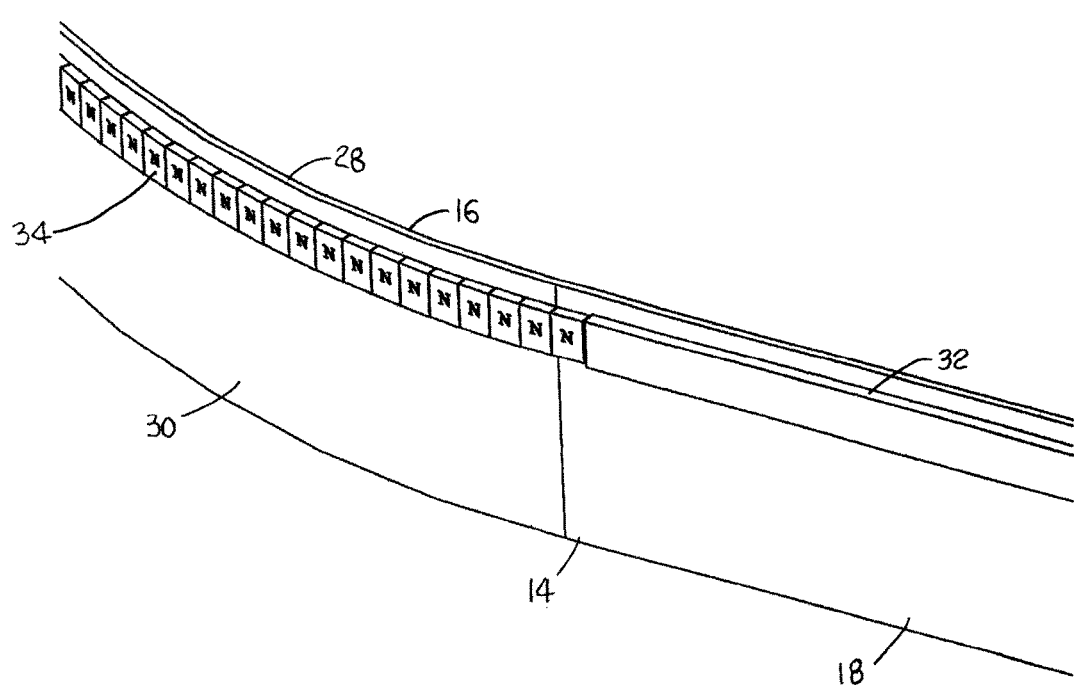
FIG. 2 is an enlarged view of a portion of the conveyor frame of the conveyor of FIG. 1 showing a magnetic bearing.

As shown in FIG. 2, the conveyor frame 14 has an inner side rail 30. In the straight segment 18, the side rail 30 has a wearstrip 32 made of a durable, low-friction material for low-friction sliding contact with the side edge of the conveyor belt. In the turn section 16 the wearstrip is replaced with an array of permanent magnets 34 along the inside radius 28.

Figure 3:
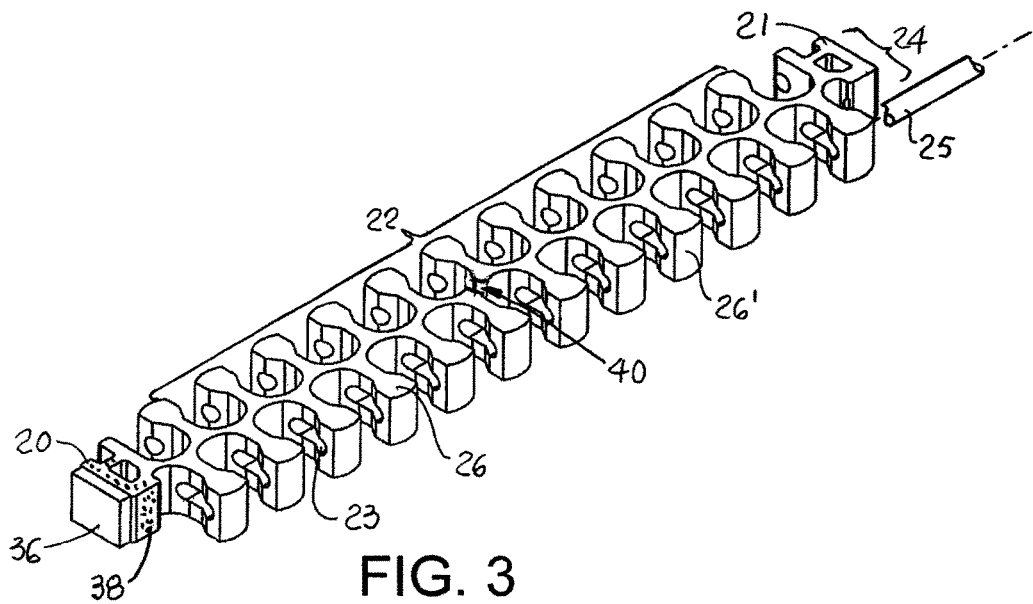
FIG. 3 is an isometric view of a belt module usable in the conveyor of FIG. 1.

As shown in FIG. 3, the side edge 20 of a belt module 26 that rides along the inside radius of the turn section includes an electrically conductive element. The electrically conductive element can be a side plate 36 made of an electrically conductive material such as copper or aluminum and attached to or embedded in the side edge 20, or it can be electrically conductive fibers or particles 38 mixed with plastic resin and molded together to form the module's edge 20. For belts that have to negotiate turns in only one direction, the electrically conductive material need reside at only one side edge. If the radius belt negotiates both left and right turn sections, both side edges have electrically conductive material. In FIG. 3, the belt module 26 forms a belt row 24 with an adjacent module 26'. The two modules are separated from each other at a seam 40. The adjacent edge module 26' has a side edge 21 without electrically conductive elements. The intermediate portion 22 of the belt row 24 is shown devoid of electrically conductive elements.

Figure 4:
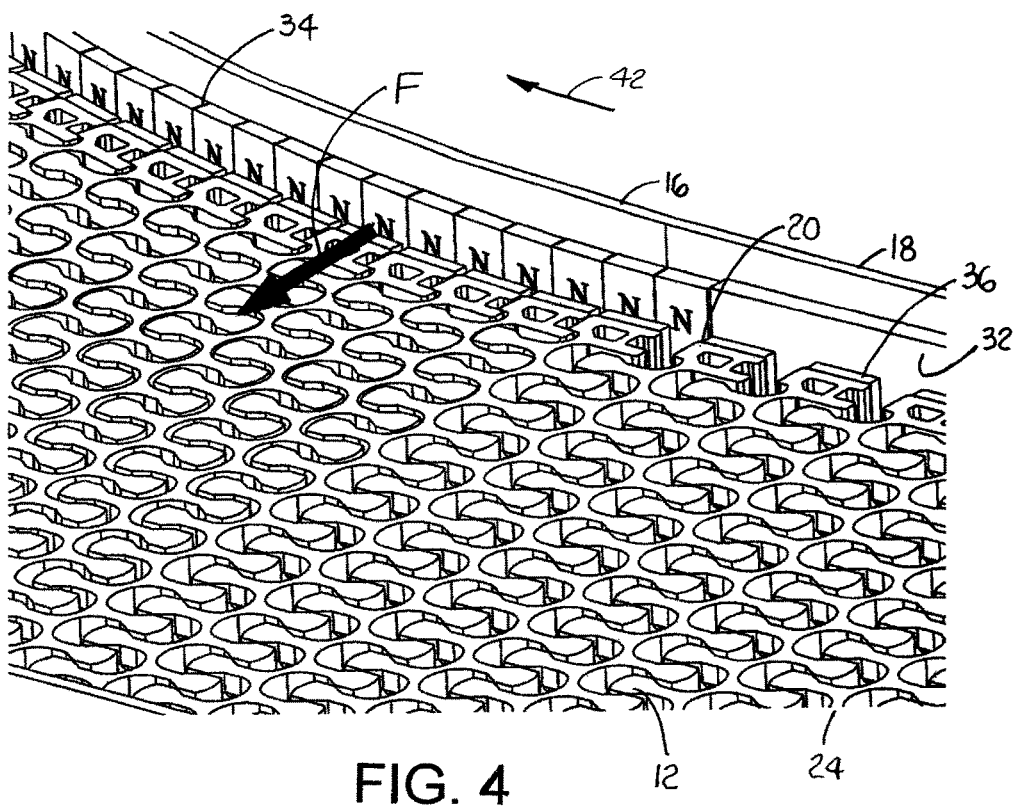
FIG. 4 is an enlarged view of the radially inner portion of the turn section of the conveyor of FIG. 1.

The sideflexing conveyor belt 12 is shown in FIG. 4 entering the turn section 16 of the carryway. The belt is motor-driven by drive sprockets or drums in a direction of belt travel 42. In the straight segment 18 the side edge 20 of the belt with the electrically conductive plates 36 on each belt row 24 can slide along the side-rail wearstrip 32. As the belt enters the turn section 16, the inside edge 20 of the belt collapses. The permanent magnets 34 forming the array produce a permanent magnetic field that induces electric currents in the electrically conductive material, such as the plates 36, at the belt edge 20 as the belt advances through the turn. The induced currents produce reaction magnetic fields that oppose, by Lenz's Law, the array's permanent magnetic field. The opposing fields produce a radially outward force F that repels the belt 12 away from the inside rail and the array of magnets 34. The radially outward force F prevents the inside edge 20 of the belt 12 from sliding on the turn section 16. Thus, the magnets and the electrically conductive elements form a touchless magnetic bearing. Frictional contact is avoided, which reduces belt tension and belt wear. And the faster the belt 12 is driven, the greater the repelling force F. Arranging the permanent magnets in a Halbach array increases the strength of the magnetic field coupled to the electrically conductive elements. The two field-producing elements—the permanent-magnet array and the electrically conductive elements—could alternatively be swapped in position such that the permanent magnets are in the edge of the conveyor belt and the electrically conductive elements are in the conveyor frame at the inside radius of a turn section. Such an arrangement would likewise produce a magnetic bearing with a radially outward force pushing the belt away from the inside radius of a turn.

What is claimed is:

1. A conveyor comprising:
 a conveyor frame including a carryway with a turn section;
 a sideflexing conveyor belt supported in the conveyor frame and having a side edge with first field-producing elements;
 wherein the sideflexing conveyor belt is driven along the carryway and through the turn section, the side edge with the first field-producing elements advancing along an inside radius of the turn section;
 second field-producing elements disposed along the carryway along the inside radius of the turn section,
 wherein the first field-producing elements are electrically conductive elements and the second field-producing elements form an array of permanent magnets, or vice versa, and
 wherein the array of permanent magnets produces a magnetic field that induces currents in the electrically conductive elements that produce an induced magnetic field opposed by the magnetic field of the array to create a radially outward force against the sideflexing conveyor belt advancing through the turn section.

2. A conveyor as in claim 1 wherein the electrically conductive elements comprise plates made of an electrically conductive material attached to the side edge of the conveyor belt.

3. A conveyor as in claim 2 wherein the electrically conductive material is copper or aluminum.

4. A conveyor as in claim 1 wherein the first field-producing elements are embedded in the sideflexing conveyor belt.

5. A conveyor as in claim 1 wherein the sideflexing conveyor belt is molded of a plastic material mixed with the electrically conductive elements.

6. A conveyor belt as in claim 1 wherein the array of permanent magnets is arranged in a Halbach array.

7. A conveyor as in claim 1 wherein the conveyor belt comprises:
 a series of rows of belt modules hingedly linked together and extending in width across an intermediate portion from a first side edge along the inside radius of the turn section to a second side edge.

8. A conveyor as in claim 7 wherein each of the rows of belt modules has one first field-producing element in the form of an electrically conductive plate mounted at the first side edge.

9. A conveyor as in claim 7 further comprising electrically conductive plates disposed along the second side edge of the rows of belt modules.

10. A conveyor as in claim 7:
 wherein the intermediate portion of the belt modules is devoid of electrically conductive elements.

11. A conveyor as in claim 7 wherein the belt modules are molded of a plastic material mixed with the first field-producing elements.

* * * * *